July 25, 1933.                W. L. ORR                1,919,527
TRAP
Filed Oct. 11, 1930

INVENTOR
Walter L. Orr
BY
Westall and Wallace
ATTORNEYS

Patented July 25, 1933

1,919,527

UNITED STATES PATENT OFFICE

WALTER L. ORR, OF LOS ANGELES, CALIFORNIA

TRAP

Application filed October 11, 1930. Serial No. 488,045.

The invention in general relates to jaw type of trap and as disclosed herein is particularly adapted for catching small animals such as mice. It comprises a jaw which is spring operated and a novel trigger mechanism.

The primary object of this invention is to provide a simple trap, economical to manufacture and assemble and having a sensitive trigger mechanism. The more specific objects of this invention are to provide a trap having any or all of the following features: a jaw, a trigger and bait lever arranged to form a compound lever system wherein setting of the jaw positively raises the bait lever to set position and depressing of the bait lever causes releasing of the jaw; and a novel bearing structure for the pivoting of the jaw to the base so as to enable easy assembly.

Figure 1:
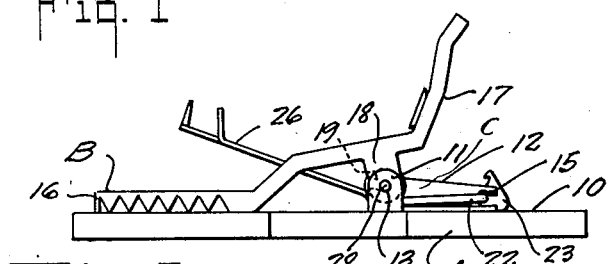
Figure 2:
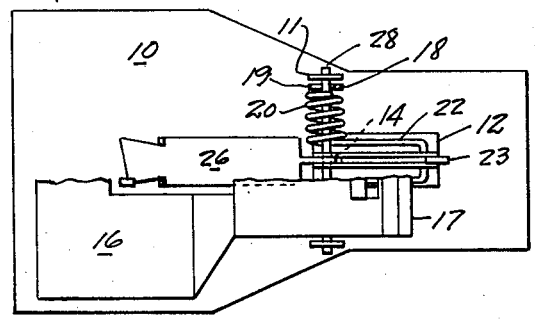
Figure 3:
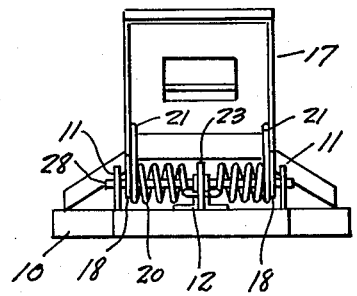
Figure 4:
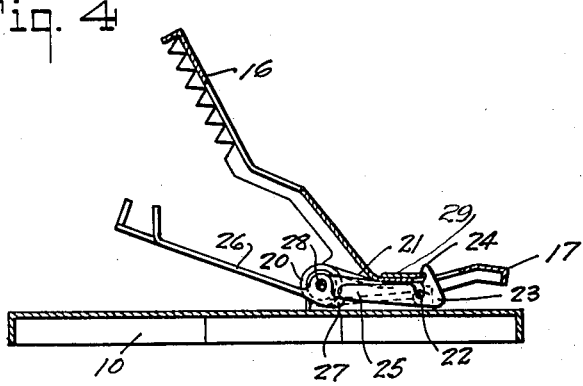
Figure 5:
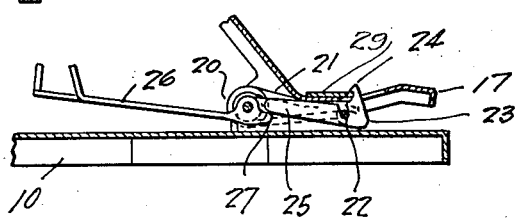

These objects together with other objects and corresponding accomplishments are obtained by means of the embodiment of the invention illustrated in the accompanying drawing, in which:

Fig. 1 is a side elevation of the trap in sprung position; Fig. 2 is a plan view with parts broken away; Fig. 3 is a rear elevational view; Fig. 4 is a longitudinal section with the trap set; and Fig. 5 is a fragmentary sectional view showing the trigger mechanism set and about to be released.

Referring with more particularity to the drawing, a base A has pivotally mounted thereon a jaw B. Trigger mechanism is indicated generally by C and is adapted to hold the jaw in set position.

The base plate marked 10 has upstanding ears at the sides. Between the ears and at the mid portion of the plate is a holder 12 comprising a channel. Ears 11 have pin apertures 13 and the channel is so disposed that its front end portion is in line with the apertures and is provided with pin apertures 14. There is an undercut 15 at the rear end of the channel to accommodate a portion of an operating spring.

An angled jaw having a capturing portion 16 coacting with the base plate 10 and a catch extension or bail 17 is provided. A catch 29 extends across bail 17. Ears 18 depend from the jaw at the juncture of the jaw portion and catch extension. These ears are slotted, as indicated by 19 for receiving the hinge pin 28. A lever of the first class is thus provided. Embracing the hinge pin is a torsion spring 20 having ends 21 which engage the extension on its underside. At the mid portion of spring 20, a loop 22 is extended so as to embrace the holder 12 with the yoke of the loop disposed under the undercut 15 of the holder and serving as a catch. The spring 20 tends to spring the jaw into capturing position. In the present structure loop 22 is disposed to be coupled to the catch. A trigger mechanism is provided for holding the jaw in set position.

The trigger mechanism comprises a trigger 23 having a hooked keeper 24 adapted to fulcrum at a recess on the yoke of loop 22. In such position the tip of the keeper may overhang the yoke or be positioned to release the yoke. An arm 25 on the trigger extends forwardly. The trigger is a lever of the first class with the keeper tip at one side of its fulcrum, and the arm 25 on the other. Trigger 23 is loosely mounted in holder 12. Disposed in the holder 12 is a bait lever 26 of the first class having a finger 27 underlying arm 25. The bait lever is apertured and pivotally mounted on hinge pin 28 which may be inserted endwise through ears 11, 18 and the torsion spring. Bait prongs are upset from the other end of the lever to hold bait in position for the animal to operate the lever.

It will be noted that trigger 23 does not bear on base plate 10 or the holder 12 except incidentally in sprung position. It fulcrums about the yoke of loop 22. A compound lever motion is provided between the trigger 23 and lever 26. The trap may be set by pressing catch extension 17 toward base plate 10. The catch 29 passes under hook 24 and pulls the hook up, the latter being held against displacement by the holder undercut 15. The bait end of lever 26 is then positively swung with the bait holding end upward. Upon depressing the bait end of lever 26, hook 24 is swung from over the catch 29 and the latter released so that the torsion spring 20 may swing the jaw to capturing position. The undercut 15 merely prevents the entire top portion from tipping forward when the trap is set and takes no spring pressure. The trap may be set by pressing downwardly on extension 17, the trigger automatically catching and the bait lever being raised. The trigger mechanism is sensitive and little pressure on the bait lever is required to spring the trap.

What I claim is:—

1. A jaw trap comprising a base, a jaw hinged thereon to coact with said base in sprung position and grip a captive, said jaw being a lever of the first class with a catch extension, a spring to move the jaw to capturing position, a trigger mechanism for securing the jaw in set position with said spring contracted including a trigger lever of the first class having a keeper at one end to engage said catch extension and an operating arm at the other end and a bait lever of the first class having an end for a bait holder and the other end for engagement with said arm, said bait lever being positioned in contact relation to said arm to urge the bait holder to raised position and enable said trigger lever to be swung by said bait lever to release said jaw.

2. A jaw trap comprising a base, a jaw hinged thereon to coact with said base in sprung position and grip a captive, said jaw being a lever of the first class with a capturing portion at one end and a catch extension at the other end, a torsion spring having its ends engaging said jaw at the catch extension whereby to spring the jaw to capturing position and having a coupling loop; a trigger mechanism for securing the jaw in set position with said spring under tension including a trigger lever of the first class fulcruming on said coupling loop and having a keeper at one end to engage said catch extension and couple the latter to said coupling loop and having an operating arm at the other end, and a bait lever of the first class for engagement at one end with said arm and having a bait holder at the other end, said bait lever being positioned in contact relation to said arm to urge the bait holder to raised position and to enable said trigger lever to be swung by said bait lever and release said jaw.

3. A jaw trap comprising a base, a hinge pin on said base, a jaw constituting a lever of the first class pivoted on said pin to coact with said base in sprung position and grip a captive and having a catch extension, a channel trigger holder on said base, a torsion spring having its ends engaging said jaw whereby to spring the jaw to capturing position and having a coupling loop paralleling and overlapping said holder at the other end; a trigger mechanism for securing the jaw in set position with said spring under tension including a trigger lever of the first class mounted in the channel of said holder and fulcruming on said coupling loop at the overlapping portion and having a keeper at one end to engage said catch extension and couple the latter to said coupling loop and having an operating arm at the other end, and a bait lever of the first class pivoted on said pin for engagement at one end with said arm and having a bait holder at the other end urged into raised position.

WALTER L. ORR.